(12) United States Patent
Vesma et al.

(10) Patent No.: US 8,782,732 B2
(45) Date of Patent: Jul. 15, 2014

(54) METHOD FOR SIGNALLING TIME-SLICING PARAMETERS IN THE SERVICE INFORMATION

(75) Inventors: Jussi Vesma, Turku (FI); Matti Puputti, Turku (FI)

(73) Assignee: Nokia Corporation, Espoo (FI)

( * ) Notice: Subject to any disclaimer, the term of this patent is extended or adjusted under 35 U.S.C. 154(b) by 1815 days.

(21) Appl. No.: 10/556,751

(22) PCT Filed: May 11, 2004

(86) PCT No.: PCT/IB2004/050638
§ 371 (c)(1),
(2), (4) Date: Nov. 14, 2005

(87) PCT Pub. No.: WO2004/102964
PCT Pub. Date: Nov. 25, 2004

(65) Prior Publication Data
US 2007/0074264 A1    Mar. 29, 2007

(30) Foreign Application Priority Data
May 13, 2003    (GB) .................................. 0310976.6

(51) Int. Cl.
*H04N 7/16* (2011.01)
(52) U.S. Cl.
USPC ...................................................... 725/135
(58) Field of Classification Search
USPC ...................................................... 370/337
See application file for complete search history.

(56) References Cited

U.S. PATENT DOCUMENTS

| | | | |
|---|---|---|---|
| 5,382,949 A | | 1/1995 | Mock et al. |
| 5,537,410 A | * | 7/1996 | Li .................................. 370/465 |
| 5,923,655 A | * | 7/1999 | Veschi et al. .................. 370/394 |
| 5,990,958 A | * | 11/1999 | Bheda et al. ............... 348/407.1 |
| 6,441,782 B2 | * | 8/2002 | Kelly et al. .................... 342/359 |
| 6,477,382 B1 | | 11/2002 | Mansfield et al. |
| 6,731,615 B1 | * | 5/2004 | Bousquet et al. ............. 370/321 |
| 7,206,367 B1 | * | 4/2007 | Moore .......................... 375/354 |
| 7,230,978 B2 | * | 6/2007 | Bitterlich et al. ............. 375/219 |
| 7,844,214 B2 | | 11/2010 | Laiho et al. |
| 2002/0023270 A1 | * | 2/2002 | Thomas et al. ................. 725/95 |

(Continued)

FOREIGN PATENT DOCUMENTS

| | | |
|---|---|---|
| AT | 445289 | 10/2009 |
| EP | 1337071 | 8/2003 |

(Continued)

OTHER PUBLICATIONS

"Digital Video Broadcasting (DVB); Specification for Service Information (SI) in DVB Systems;" ETSI EN 300 468 V1.41.1; European Standard (Telecommunications series); (Nov. 2000).

(Continued)

*Primary Examiner* — Olumide T Ajibade Akonai
*Assistant Examiner* — Shantell L Heiber
(74) *Attorney, Agent, or Firm* — Banner & Witcoff, Ltd.

(57) ABSTRACT

A terrestrial digital video broadcasting (DVB-T) network is used to transmit IP datagrams to receiving devices using multiprotocol encapsulation (MPE). MPE datagram sections and, if forward error correction (FEC) is used, MPE-FEC datagram sections are transmitted in time-sliced bursts. Time slicing parameters specifying a minimum time between bursts and bit rate output of a receiving device time slicing buffer can be used to help improve power saving and improve quality of service.

32 Claims, 9 Drawing Sheets

(56) References Cited

U.S. PATENT DOCUMENTS

| | | | |
|---|---|---|---|
| 2002/0075827 A1 | 6/2002 | Balogh et al. | |
| 2002/0105976 A1* | 8/2002 | Kelly et al. | 370/519 |
| 2003/0086373 A1* | 5/2003 | Kronz | 370/235 |
| 2003/0125047 A1* | 7/2003 | Chen et al. | 455/456 |

FOREIGN PATENT DOCUMENTS

| | | |
|---|---|---|
| EP | 2315379 | 4/2011 |
| GB | 2305081 | 3/1997 |
| WO | WO 99/00931 | 1/1999 |
| WO | WO02/82834 A1 * | 3/2001 |
| WO | WO 01/97538 | 12/2001 |
| WO | WO 03/069886 | 8/2003 |

OTHER PUBLICATIONS

"Digital Video Broadcasting (DVB); DVB Specification for data broadcasting;" ETSI EN 301 192 V1.4.1; European Standard (Telecommunications series); (Jun. 2004).

"Digital Video Broadcasting (DVB); Transmission System for Handheld Terminals (DVB-H);" ETSI EN 302 304 V1.1.1; European Standard (Telecommunications series); (Jun. 2004).

ETSI; European Broadcasting Union; ETSI TR 101 891 V1.1.1; Digital Video Broadcasting (DVB); Professional Interfaces: Guidelines for the implementation and usage of the DVB Asynchronous Serial Interface (ASI); Feb. 14, 2001; pp. 1-9.

* cited by examiner

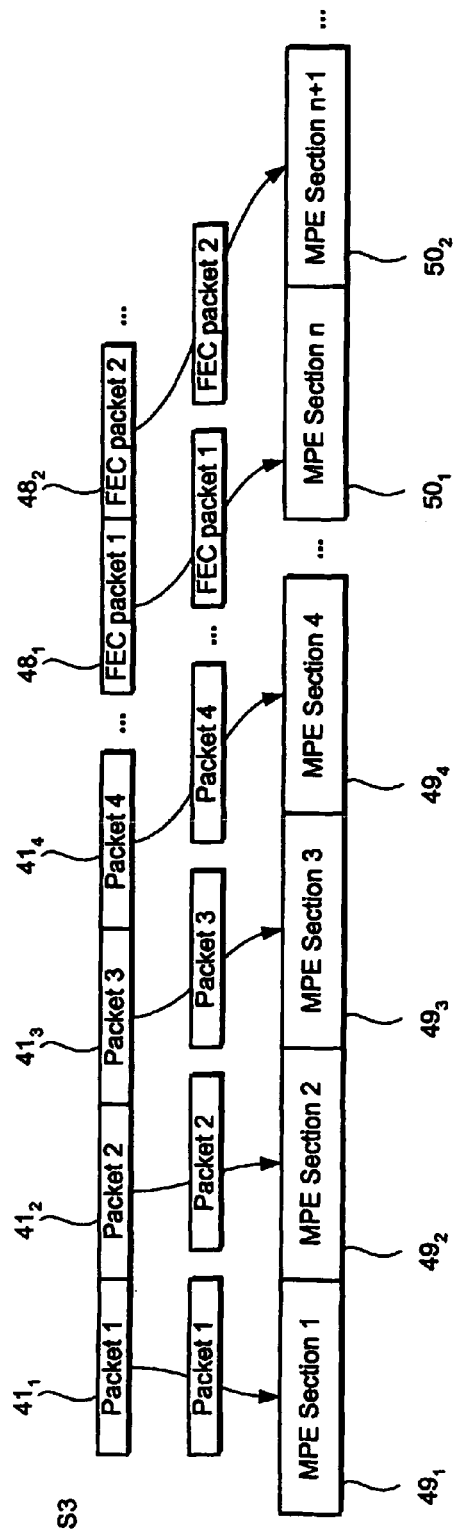
Fig. 9
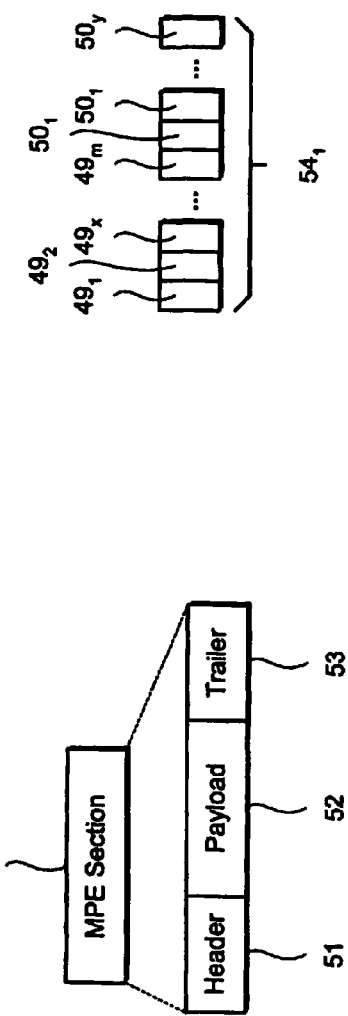
Fig. 11
Fig. 10

METHOD FOR SIGNALLING TIME-SLICING PARAMETERS IN THE SERVICE INFORMATION

CROSS REFERENCE TO RELATED APPLICATIONS

This application is the U.S. National Stage of International application number PCT/IB2004/050638 filed on May 11, 2004 and published in English on Nov. 25, 2004 under publication number WO 2004/102964 A1, which in turn is claiming priority from Great Britain patent application number 0310976.6 filed May 13, 2003.

FIELD OF THE INVENTION

The present invention relates to a method of signalling in a communications network, particularly, but not exclusively, to a method of signalling time-slicing parameters in a digital video broadcasting (DVB) network.

BACKGROUND ART

Mobile communications systems are known which can provide enough bandwidth to allow streaming of video using advanced compression techniques, such as MPEG-4. For example, a third generation mobile network has a maximum bandwidth of 384 kilobits per second (kbps). However, this is not enough for some types of services, such as file downloading.

Nevertheless, higher bandwidth transmission systems are known. For example, a Digital Video Broadcasting (DVB) transmission system can provide bandwidth of 10 Mbps or more. Thus, it is possible to augment a mobile communications system with a higher bandwidth transmission system.

DVB receivers are known in applications such as digital television. Usually, DVB receivers are fixed and mains-powered. However, mobile handheld terminals are usually battery-powered and so power is limited.

The average power consumption of a DVB receiver can be reduced by using a scheme based on time division multiplexing (TDM). Such a scheme is called time slicing.

If a service is requested, data can be transmitted using time slicing. Bursts of data are sent using significantly higher bandwidth compared to the bandwidth needed to send the data using static bandwidth. Each burst includes an indication of time to the beginning of the next burst, which is referred to as "delta-t". Between bursts, data is not transmitted, allowing other services to use the bandwidth allocated to the service. Thus, the receiver need only stay active for a portion of time while receiving bursts. Nevertheless, received bursts can be buffered and consumed at a relatively more uniform and lower rate.

However, time slicing suffers the problem that the receiver requires a sufficiently large buffer. If the buffer is too small, then the receiver may begin receiving a burst before the previous burst has been consumed. The problem can be exacerbated if data needs to be decoded before consumption since decoding introduces a time lag.

The present invention seeks to provide a method of signalling in a communications system.

SUMMARY OF THE INVENTION

According to the present invention there is provided a method of signalling in a communications network, the method comprising providing a set of time-slicing parameters for describing bursts of data, including the time-slicing parameters in service information and forming bursts according to the set of time-slicing parameters.

This can have the advantage that a device is enabled to determine whether it can receive data bursts and/or to configure itself to receive the data bursts.

Providing the set of time-slicing parameters may comprise defining a minimum time between bursts, defining a desired output rate of a buffer for receiving and outputting a burst or defining a maximum average transfer rate over one time slicing cycle.

Coupling the time-slicing parameters to service information may comprise including the set of time-slicing parameters in a descriptor. The method may further comprise including the descriptor in a table for describing service provided through the communications network. The method may further comprise including the descriptor in a table for describing configuration of the communications network.

The bursts of data may comprise data segments, such as multiprotocol encapsualtion (MPE) sections, for example in the form of a multiprotocol encapsualtion-forward error correction (MPE-FEC) frame. The method may comprise encapsulating the MPE-FEC frame in at least one transport stream packet.

The burst of data may comprise a set of sections. The method may comprise encapsulating the set of sections in at least one transport stream packet.

The communications network may be a digital video broadcasting (DVB) system.

The method may comprise forwarding the bursts to a network element.

According to the present invention there is also provided a method of operating an element in a communications network, the method comprising receiving a set of time-slicing parameters for describing bursts of data, coupling the time-slicing parameters to service information and forming bursts according to the set of time-slicing parameters.

According to the present invention there is further provided a method of operating a receiving device for receiving bursts of data through a communications network, the method comprising receiving service information through the communications network and obtaining from the service information a set of time-slicing parameters for describing the data bursts.

The method may comprise determining whether the data bursts can be buffered and configuring a receiver to receive the data bursts.

The set of time-slicing parameters may include a minimum time between bursts and the method may further comprise determining whether a burst has not been received and, if a burst has not been received, configuring a receiver to receive the data bursts using said minimum time or determining whether there is enough time to decode data received within a burst.

The set of time-slicing parameters may include a given output rate of a buffer and the method may further comprise determining whether the given output rate exceeds an actual output rate of a buffer.

According to the present invention there is also provided a computer program product comprising computer program instructions stored on a readable medium, the instructions for causing a data processing apparatus to perform the method.

According to the present invention there is also provided a method of transmitting in a communications network, the method comprising providing a set of time-slicing parameters for describing bursts of data, coupling the time-slicing parameters to service information and forming bursts according to the set of time-slicing parameters.

The method may comprise transmitting the service information and transmitting the bursts.

According to the present invention there is still further provided a system of signalling in a communications network, the method comprising providing a set of time-slicing parameters for describing bursts of data, coupling the time-slicing parameters to service information and forming bursts according to the set of time-slicing parameters.

According to the present invention there is also provided a network element configured to receive a set of time-slicing parameters for describing bursts of data, couple the time-slicing parameters to service information; and form bursts according to the set of time-slicing parameters.

The network element may comprise a transmitter.

According to the present invention there is still further provided a terminal comprising a receiver for receiving bursts of data through a communications network and a processor for controlling operation of said receiver, the terminal being configured to receive service information from said communications network, to obtain from the service information a set of time-slicing parameters describing the data bursts and to control operation of the receiver in dependence upon the set of time-slicing parameters.

The set of time-slicing parameters may comprise a maximum average transfer rate over one time slicing cycle.

BRIEF DESCRIPTION OF THE DRAWINGS

An embodiment of the present invention will now be described with reference to the accompanying drawings in which:

FIG. 9 shows datagrams being placed in datagram sections;

FIG. 10 illustrates a datagram section;

FIG. 11 illustrates a burst;

DETAILED DESCRIPTION OF THE INVENTION

Communication System 1

Figure 1:
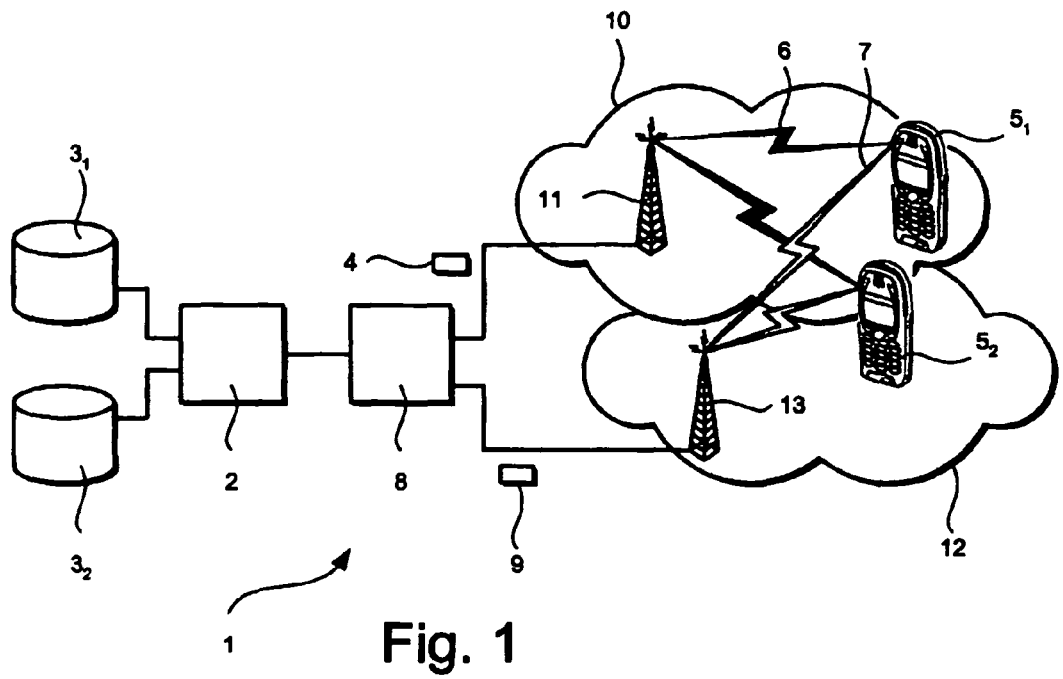
FIG. 1 shows a communication system.

Referring to FIG. 1, a communication system 1 is shown. The communications system 1 includes a content provider 2 which has access to sources $3_1$, $3_2$ of content, such as audio-visual content, data files or images.

Content 4 may be transmitted using internet protocol (IP) over a digital broadband network, such as a terrestrial Digital Video Broadcasting (DVB-T) network, as an IP datacasting (IPDC) service, to one or more receiving devices $5_1$, $5_2$. The receiving devices $5_1$, $5_2$, in the form of mobile telephones with video capabilities, are configured to receive data from at least two different communication channels 6, 7.

Content data 4 is transmitted to a network element 8 which is a server configured to receive the content data 4 and to generate recovery data 9 for use in error correction of the content data 4. The content data 4 is transmitted to the receiving devices $5_1$, $5_2$ via a first communications channel 6. In this example, the first communications channel 6 is provided by a first communications network 10 in the form of broadcasting network, such as a DVB-T network, which includes a transmitter 11. Content data 4 is broadcast, multicast or unicast to receiving devices $5_1$, $5_2$ within a cell (not shown) associated with the first communication network 10.

Recovery data 9 may be transmitted to the receiving devices $5_1$, $5_2$ via a second communication channel 7. In this example, the second communications channel 7 is provided by a second, different communications network 12 in the form of a mobile network, such as a third generation (3G) mobile network, which include a transmitter 13. Recovery data 9 and other data, such a voice data, are transmitted to receiving devices $5_1$, $5_2$ within a cell (not shown) associated with the second communication network 12. The second communications network 12 may be a second generation (2G) or a two-and-half generation (2.5G) network.

In FIG. 1, the communication system 1 is shown in a simplified form. Other elements, such as further transmitters (not shown), network elements (not shown) or networks (not shown) may be included.

The transmitters 11, 13 each provide a transmitter node for transmitting data to the receiving devices $5_1$, $5_2$, which constitute receiver or recipient nodes.

Network Element 8

Figure 2:
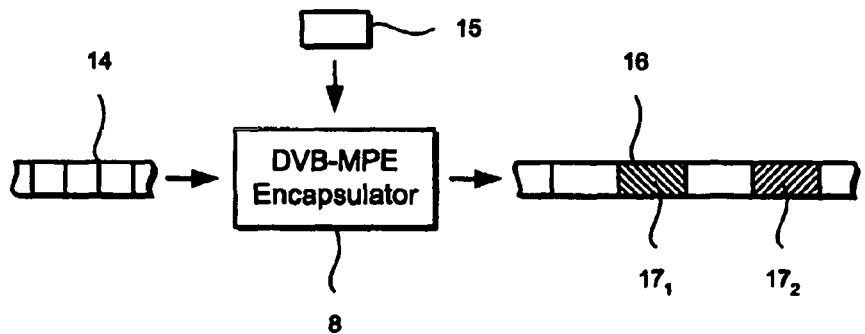
FIG. 2 shows a multiprotocol encapsulation (MPE) encapsulator which outputs transport stream packets.

Referring to FIG. 2, the network element 8 is a DVB multiprotocol encapsulation (MPE) encapsulator. The network element 8 receives IP datagrams 14 and service data 15, such as MPEG program specific information (PSI) and DVB service information (SI), and generates a transport stream 16 according to ISO/IEC 13818-1. The transport steam 16 comprises transport stream (TS) packets 17, typically 188 bytes long.

Figure 3:
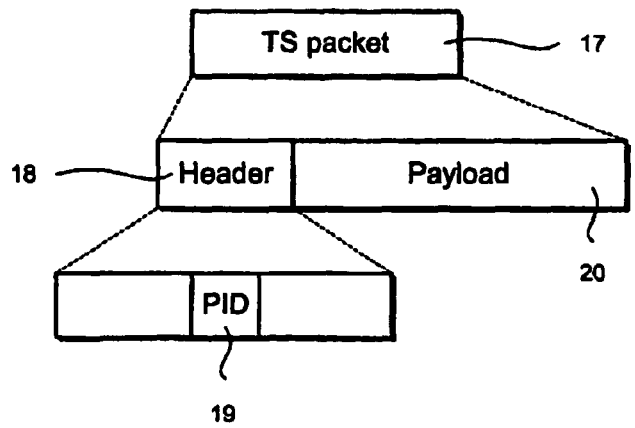
FIG. 3 illustrates a transport stream packet.

Referring also to FIG. 3, the transport stream 16 is divided into a number of logical channels. The logical channel to which a TS packet 17 belongs is defined in a packet header 18 using a packet identifier (PID) 19. The packet identifier can be used to identify contents of a TS packet payload 20.

For example, the contents of a first TS packet 17, may be identified as being video, audio or another type of data by specifying a PID value between 0x0030 to 0x1FFE (as hexadecimal number). The contents of a second TS packet $17_2$ may be identified as containing all or part of network information table (NIT) by specifying PID=0x0010. As will be explained in more detail later, an NIT and other types of table may be used to signal time slicing parameters and other parameters relating to forward error correction to a receiving device $5_1$, $5_2$ (FIG. 1).

The MPE encapsulator 8 also performs other functions and these will be described in more detail later.

Receiving Device $5_1$, $5_2$

Figure 4:
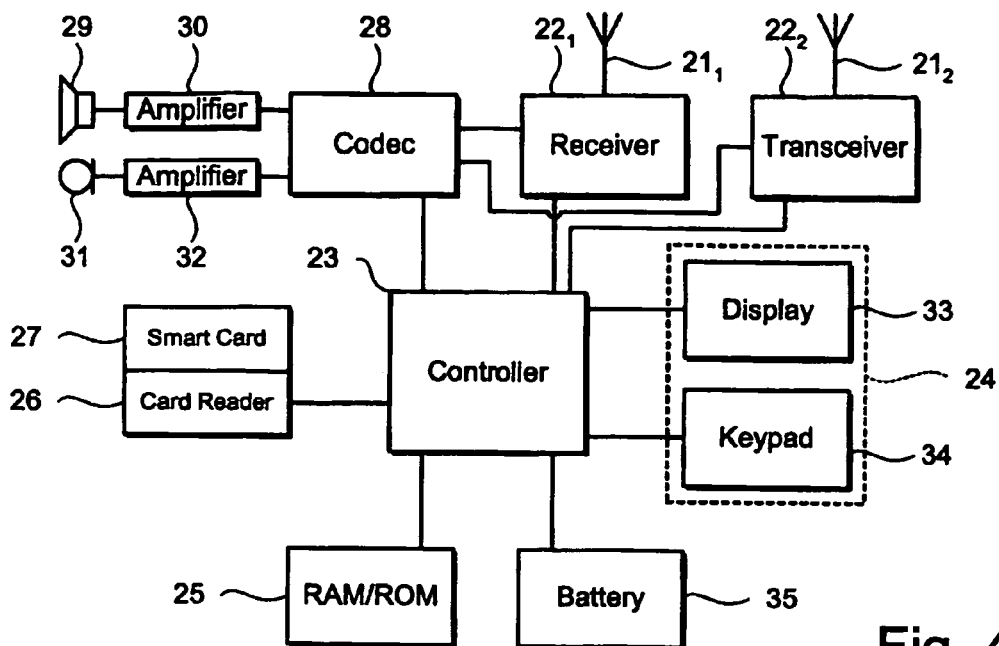
FIG. 4 is a schematic diagram of a mobile telephone handset.

Referring to FIG. 4, each receiving device $5_1$, $5_2$ is preferably in the form of a mobile telephone handset with a multimedia capability.

Each receiving device $5_1$, $5_2$ includes first and second antennae $21_1$, $21_2$, a receiver $22_1$ and a transceiver $22_2$. In this example, the first antenna $21_1$ and receiver $22_1$ are used to receive signals from the first communications network 10, in this case a DVB-T network. The second antenna $21_2$ and transceiver $22_2$ are used to transmit and receive signals to and from the second communications network 10. The receiver and transceiver $22_1$, $22_2$ each include respective r.f. signal processing circuits (not shown) for amplifying and demodulating received signals and respective processors (not shown) for channel decoding and demultiplexing.

Each receiving device $5_1$, $5_2$ also includes a controller 23, a user interface 24, memory 25, a smart card reader 26, smart card 27 received in the smart card reader 26, a coder/decoder (codec) 28, a speaker 29 with corresponding amplifier 30 and a microphone 31 with a corresponding pre-amplifier 32.

The user interface 24 comprises a display 33 and a keypad 34. The display 33 is adapted for displaying images and video by, for instance, being larger and/or having greater resolution than a display of conventional mobile telephone and being capable of colour images. Each receiving device $5_1$, $5_2$ also includes a battery 35.

The controller 23 manages operation of a receiving device $5_1$, $5_2$ under the direction of computer software (not shown) stored in memory 25. For example, the controller 23 provides an output for the display 33 and receives inputs from the keypad 34.

Figure 5:
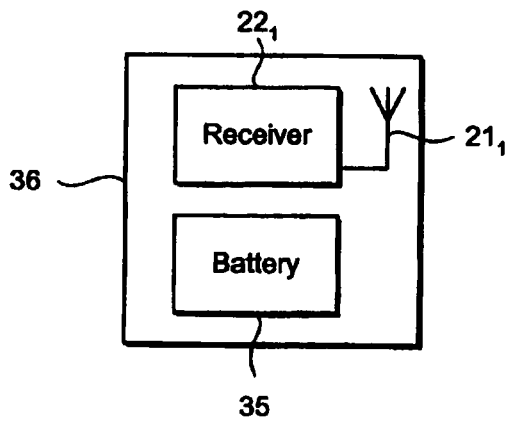
FIG. 5 is schematic diagram of a battery pack for a mobile telephone handset.

Referring to FIG. 5, the battery 35 and the first antenna $21_1$ and the receiver $22_1$ may be incorporated into a battery pack 36. By replacing a battery pack (not shown) of a conventional mobile telephone handset with battery pack 36 including receiver $22_1$ and by also providing suitable software, a conventional mobile telephone handset (not shown) may be modified to receive data via the first communications network 10. Alternatively, the first antenna $21_1$ and the receiver $22_1$ may be incorporated into a cover (not shown) for a conventional mobile telephone handset (not shown).

The receiving device $5_1$, $5_2$ may be modified providing a single receiver adapted to receive signals from the first and second communications networks 10, 12 (FIG. 1) and a transmitter adapted to transmit signals to the second communications network 12 (FIG. 1). Alternatively, a single transceiver for both communications networks 10, 12 may be provided.

Figure 6:
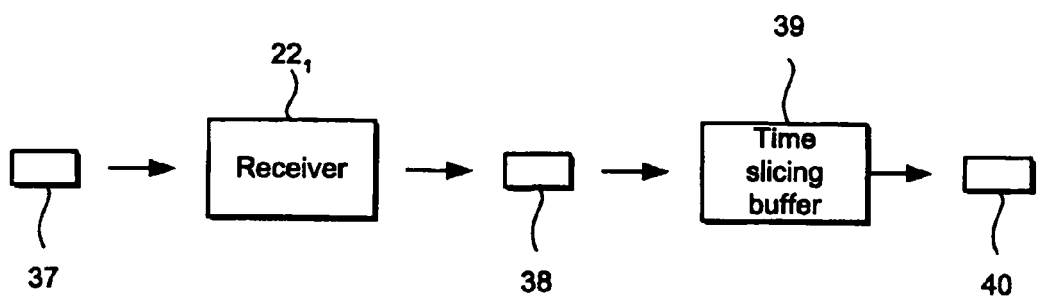
FIG. 6 shows a receiver and a time slicing buffer included in the mobile telephone handset shown in FIG. 4.

Referring to FIG. 6, the receiver $22_1$ receives a signal 37 from the first communications network 10. The signal 37 is amplified, demodulated, channel decoded and demultiplexed. The resulting demultiplexed signal (not shown) is filtered so as to extract bursts 38 of datagrams. The datagram bursts 38 are fed into a time slice buffer 39 which is provided by controller 23 and memory 25 so as to produce a stream 40 of datagrams which is not time sliced. Preferably, the datagram stream 40 is substantially continuous and/or at a substantially constant rate.

The time slice buffer 39 will be described in more detail later.

A receiving device $5_1$ $5_2$ may be a personal data assistant (PDA) or other mobile terminal capable of at least of receiving signals via the first communications networks 10. The receiving device $5_1$ $5_2$ may also be semi-fixed or semi-portable such as a terminal carried in vehicle, such as a car.

Operation of the MPE Encapsulator 8

The MPE encapsulator 8 performs a number of functions, some of which fall into two categories: processes which involve preparing and transmitting application data in bursts and processes which involve preparing and signalling time slicing and forward error correction parameters.

Preparing and Transmitting Application Data

Figure 7:
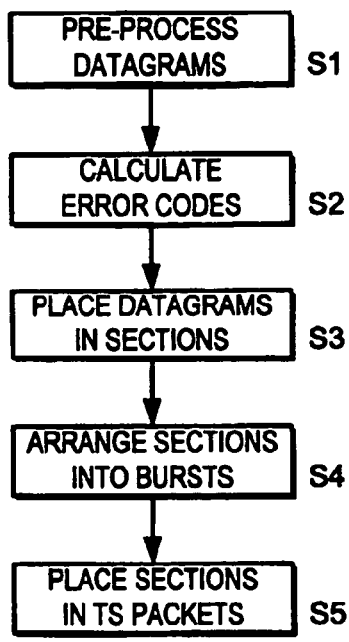
FIG. 7 is a process flow diagram of a first process performed by the MPE encapsulator shown in FIG. 2.
Figure 8:
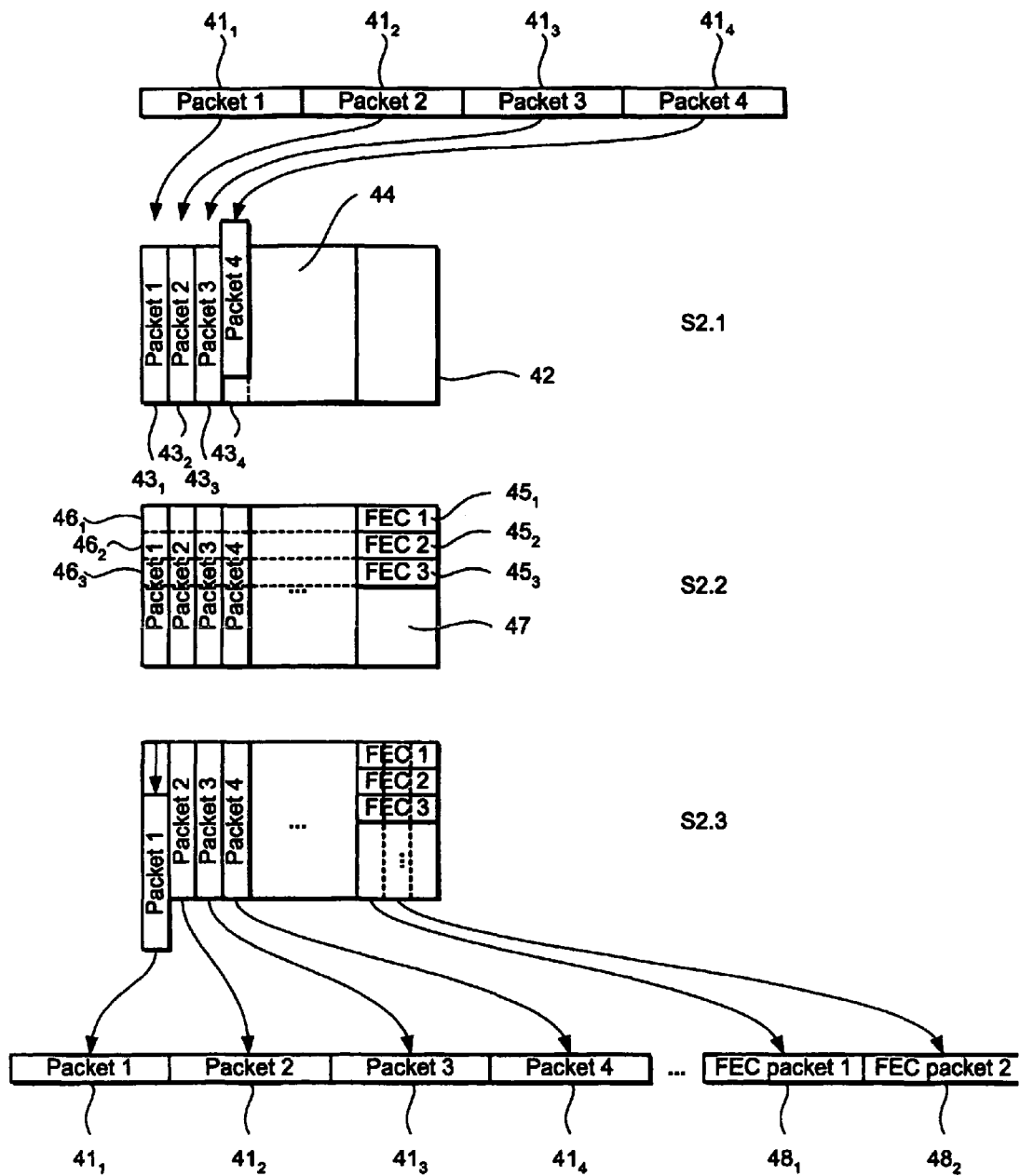
FIG. 8 shows a process by which forward error correction data is calculated.

Referring to FIGS. 7 and 8, a process by which the MPE encapsulator 8 (FIG. 1) generates forward error codes and formats data, in this case using a Digital Storage Media Command and Control (DSM-CC) section format, is described.

The MPE encapsulator 8 (FIG. 1) receives a stream of data packets $41_1$, $41_2$, $41_3$, $41_4$, in this case IP datagrams, from content provider 2 (FIG. 1) and, if necessary, pre-processes them by arranging them in order and/or dropping selected datagrams, for example based on IP address (step S1). It will be appreciated that the MPE encapsulator 8 (FIG. 1) may receive Ethernet frames (not shown) and thus, additional processing, such as removing Ethernet frame structure, may be required.

Optionally, forward error correction codes are calculated for the data packets $41_1$, $41_2$, $41_3$, $41_4$ (step S2).

The packets $41_1$, $41_2$, $41_3$, $41_4$ are stored in a coding table or array 42 (step S2.1).g The packets $41_1$, $41_2$, $41_3$, $41_4$ are stored sequentially in columns $43_1$, $43_2$, $43_3$, $43_4$ in a portion of the table 42 referred to as the application data table 44 which in this case occupies the left-most portion of the table 42. The contents of a packet $41_1$, $41_2$, $41_3$, $41_4$ can occupy one or more addressable storage locations of one or more columns $43_1$, $43_2$, $43_3$, $43_4$.

Once a given number of packets have been stored or the application data table 44 has been filled, forward error correction (FEC) data $45_1$, $45_2$, $45_3$ is calculated (step S2.2). The FEC data $45_1$, $45_2$, $45_3$, preferably in the form of Reed-Solomon data, is calculated for each row $46_1$, $46_2$, $46_3$ and entered into a portion of the table 42 referred to as the Reed-Solomon data table 47.

Preferably, the coding table 42 has 255 columns. For example, the application data table 44 may comprise 191 columns and the Reed-Solomon table 47 may comprise 64 columns. Preferably, the application data table occupies the left-most portion of table 42 and Reed-Solomon table occupies the right-most portion of the table 42. The coding table 42 may comprises a selectable number of rows, up to 1024 rows. Preferably, the table 42 comprises one-byte addressable elements. Thus, a table with 255 columns and 1024 rows may store up to 2 Mbits of data.

It will be appreciated that packets $41_1$, $41_2$, $41_3$, $41_4$ may be stored sequentially in rows and FEC data $45_1$, $45_2$, $45_3$ calculated for each column. In other words, rows and columns are interchangeable. It will also be appreciated that the length or size of packets $41_1$, $41_2$, $41_3$, $41_4$ can vary. The packets $41_1$, $41_2$, $41_3$, $41_4$ may be an uneven size. The application data table 44 may be filled with stuffing information, for example at the end of table. The stuffing information may be omitted when calculating FEC data $45_1$, $45_2$, $45_3$.

The packets $41_1$, $41_2$, $41_3$, $41_4$ and FEC packets $48_1$, $48_2$ are read out of the coding table (step S2.3). The FEC packets $48_1$, $48_2$ are read out column by column. The packets $41_1$, $41_2$, $41_3$, $41_4$ and FEC packets $48_1$, $48_2$ are separated and formatted (step S3).

The MPE encapsulator 8 (FIG. 1) preferably formats data in accordance with Section 7 of European Telecommunications Standards Institute (ETSI) Standard 301 192 "Digital Video Broadcasting (DVB); DVB specification for data broadcasting" V1.3.1 (2003-01).

Referring to FIG. 9, the MPE encapsulator 8 places packets $41_1$, $41_2$, $41_3$, $41_4$ into MPE datagram sections $49_1$, $49_2$, $49_3$, $49_4$ compliant with the DSM-CC section format, using the syntax defined in Table 1 below:

TABLE 1

| Syntax | No. of bits | Identifier |
|---|---|---|
| datagram_section( ) { | | |
| table_id | 8 | uimsbf |
| section_syntax_indicator | 1 | bslbf |
| private_indicator | 1 | bslbf |
| reserved | 2 | bslbf |
| section_length | 12 | uimsbf |
| MAC_address_6 | 8 | uimsbf |
| MAC_address_5 | 8 | uimsbf |
| reserved | 2 | bslbf |
| payload_scrambling_control | 2 | bslbf |
| address_scrambling_control | 2 | bslbf |
| LLC_SNAP_flag | 1 | bslbf |
| current_next_indicator | 1 | bslbf |
| section_number | 8 | uimsbf |
| last_section_number | 8 | uimsbf |
| MAC_address_4 | 8 | uimsbf |
| MAC_address_3 | 8 | uimsbf |
| MAC_address_2 | 8 | uimsbf |
| MAC_address_1 | 8 | uimsbf |
| if (LLC_SNAP_flag == "1") { | | |
|     LLC_SNAP( ) | | |
| } else { | | |
|     for (j=0;j<N1;j++) { | | |
|         IP_datagram_data_byte | 8 | bslbf |
|     } | | |
| } | | |
| if (section_number == last_section_number) { | | |
|     for (j=0;j<N2;j++) { | | |
|         stuffing_byte | 8 | bslbf |
|     } | | |
| } | | |
| if (section_syntax_indicator =="0") { | | |
|     checksum | 32 | uimsbf |
| } else { | | |
|     CRC_32 | 32 | rpchof |
| } | | |
| } | | |

Referring still to FIG. 8, the MPE encapsulator 8 places FEC packets $48_1$, $48_2$ into so-called MPE-FEC datagram sections $50_1$, $50_2$ using the syntax defined in Table 2 below:

TABLE 2

| Syntax | No. of bits | Identifier |
|---|---|---|
| FEC_section ( ) { | | |
|   table_id | 8 | uimsbf |
|   section_syntax_indicator | 1 | bslbf |
|   reserved_for_future_use | 1 | bslbf |
|   reserved | 2 | bslbf |
|   section_length | 12 | uimsbf |
|   padding_columns | 8 | uimsbf |
|   reserved_for_future_use | 8 | bslbf |
|   reserved | 2 | bslbf |
|   reserved_for_future_use 5 | | bslbf |
|   current_nect_indicator | 1 | bslbf |
|   section_number | 8 | uimsbf |
|   last_section_number | 8 | uimsbf |
|   real_time_parameters( ) | | |
|   for( i=0; i<N; i++ ) { | | |
|     rs_data_byte | 8 | uimsbf |
|   ) | | |
|   CRC_32 | 32 | uimsbf |
| } | | |

Referring to FIG. 10, the general structure of an MPE section 49 or MPE-FEC section 50 is shown. An MPE/MPE-FEC section 49, 50 comprises a header 51, a payload 52 and a trailer 53. The payload 52 includes a packet $41_1$, $41_2$, $41_3$, $41_4$ (FIG. 9) or a FEC packet $48_1$, $48_2$ (FIG. 9) as defined in Table 1 or 2 above.

Referring to FIG. 11, the MPE sections $49_1$, $49_2$, $49_3$, $49_4$ and MPE-FEC sections $50_1$, $50_2$ comprise a burst $54_1$. As will be explained in more detail later, the burst $54_1$ is delivered on an elementary stream, which is identified by a single PID. Between the burst $54_1$ and a next burst $54_2$ (FIG. 15), no sections are transmitted in respect of the same elementary stream.

Figure 12:
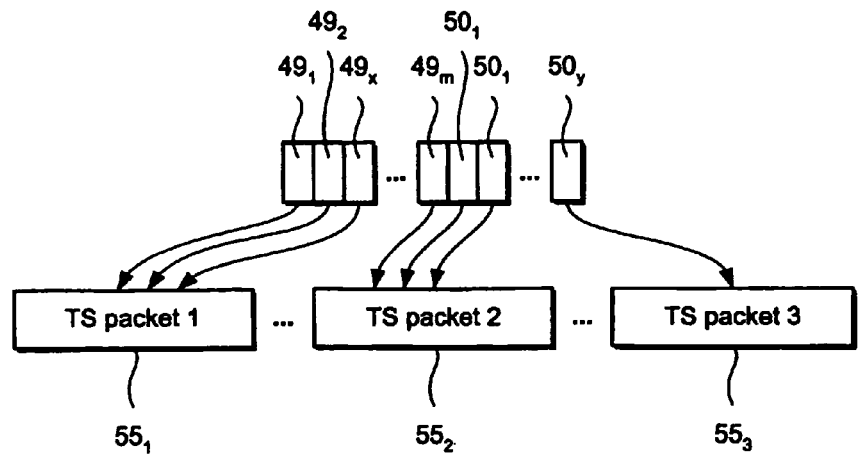
FIG. 12 illustrates encapsulation of datagram sections in transport stream packets.

Referring to FIG. 12, the first burst $54_1$ comprising the MPE sections $49_1$, $49_2$, $49_3$, $49_4$ and MPE-FEC sections $50_1$, $50_2$ are placed in TS packets $55_1$, $55_2$, $55_3$ (step S5).

In this example, a TS packet $55_1$, $55_1$, $55_3$ may include plural MPE sections $49_1$, $49_2$, $49_3$, $49_4$ and MPE-FEC sections $50_1$, $50_2$. However, a MPE section $49_1$, $49_2$, $49_3$, $49_4$ or MPE-FEC section $50_1$, $50_2$ may be divided between a plurality of TS packets $55_1$, $55_2$, $55_3$. The TS packets $55_1$, $55_2$, $55_3$ are labelled with the same PID.

The burst $54_1$ can indicate the start time of the next burst $54_2$ within the elementary stream. This is achieved by signalling to the receiving devices $5_1$, $5_2$ that time slices and/or FEC is being used and transmitting information relating to the following burst in the elementary stream.

Signalling involves including a data broadcast descriptor in a Service Description Table (SDT) transmitted using service description sections, which indicates that MAC_address 1 to MAC_address 4 fields are not being used to differentiate receivers within the elementary stream but are being used to carry real time parameters, such as delta-t. The service description sections and data broadcast descriptor is described in more detail in Sections 6 and 7 of ETSI EN 301 468 "Digital Video Broadcasting (DVB); Specification for Service Information (SI) in DVB systems"V1.5.1 (2003-01).

Transmitting information relating to the following burst comprises including so-called real time parameters in MAC_address_1 to MAC address_4 fields of each header as defined in Table 1 or 2 above of each MPE section $49_1$, $49_2$, $49_3$, $49_4$ and each MPE-FEC sections $50_1$, $50_2$. For example, Table 3 below shows real time parameter syntax:

TABLE 3

| Syntax | No. of bits | Identifier |
|---|---|---|
| realtime paramters() { | | |
|   delta_t | 12 | uimsbf |
|   table_boundary | 1 | bslbf |
|   frame_boundary | 1 | bslbf |
|   address | 18 | uimsbf |
| } | | |

Use of the delta_t field depends on whether time slicing is used on the elementary stream concerned.

If time slicing is used, the delta_t field indicates the time to the next time slice burst within the elementary stream. Delta-t is included in all MPE/MPE-FEC sections $49_1$, $49_2$, $49_3$, $49_4$, $50_1$, $50_2$ within a burst $54_1$ and the value may differ from section to section. Resolution of the delta-t is 10 ms. For example, a value 0xC00 (in hexadecimal)=3072 (in decimal) indicates the time to the next burst is 30.72 s. The value 0x00 is reserved to indicate that no more bursts will be transmitted within the elementary stream, in other word to indicate end of service. In such a case, all MPE/MPE-FEC sections $49_1$, $49_2$, $49_3$, $49_4$, $50_1$, $50_2$ within the burst $54_1$ have the same value in this field. Delta-t is defined from the transport_packet carrying the first byte of the current MPE section $49_1$, $49_2$, $49_3$, $49_4$ to the transport_packet carrying the first byte of next burst.

Therefore the delta-t may differ between MPE/MPE-FEC sections $49_1$, $49_2$, $49_3$, $49_4$, $50_1$, $50_2$ sections within a burst $54_1$.

The time indicated by delta-t is beyond the end of the maximum burst duration of the actual burst. This helps to ensure that a decoder can reliably distinguish two sequential bursts within an elementary stream.

The burst $54_1$ contains complete MPE/MPE-FEC sections $49_1$, $49_2$, $49_3$, $49_4$, $50_1$, $50_2$. In other words, MPE/MPE-FEC sections $49_1$, $49_2$, $49_3$, $49_4$, $50_1$, $50_2$ are not divided between bursts $54_1$. The burst $54_1$ contains complete datagrams $41_1$, $41_2$, $41_3$, $41_4$, $48_1$, $48_2$. In other words, datagrams $41_1$, $41_2$, $41_3$, $41_4$, $48_1$, $48_2$ are not fragmented between bursts. Transmission of empty MPE sections, that it an MPE Section with no payload, is preferably to be avoided.

Preferably, each burst $54_1$ contains at least one MPE section $41_1$, $41_2$, $41_3$, $41_4$, $48_1$, $48_2$ carrying a proper datagram $41_1$, $41_2$, $41_3$, $41_4$, $48_1$, $48_2$ containing network layer address (not shown). The address (not shown) is one of the addresses an IP/MAC Notification Table (INT) has associated with the elementary stream.

If time slicing is not used and MPE-FEC is used, the delta_t field supports a cyclic MPE-FEC frame index within the elementary stream. The value of the delta_t field increases by one for each subsequent MPE-FEC frame 42. After value "111111111111", the field restarts from "000000000000". If large portions of data is lost, this parameter makes it possible to identify to which MPE-FEC frame the any received section belongs.

The table_boundary field is a flag. When the flag is set to "1", it indicates that the current section is the last section of a table within the current MPE-FEC frame. If the section in question is an MPE section $49_1$, $49_2$, $49_3$, $49_4$, the flag indicates that the section $49_1$, $49_2$, $49_3$, $49_4$ is the last section of the application data table 44 (FIG. 8). A decoder not supporting MPE-FEC may ignore all subsequent sections until the end of the MPE-FEC frame 42, which is indicated using frame_boundary field. For each MPE-FEC frame 42, one MPE section $49_1$, $49_2$, $49_3$, $49_4$ is transmitted with this flag set. For each MPE-FEC frame 42 in which RS data 47 is transmitted, one FEC section $48_1$ is transmitted with this flag set. If MPE-FEC is not supported on the elementary stream, the flag is reserved for future use. When not used, the flag is set to "0".

The frame_boundary field is a flag. When the flag is set to "1", it indicates that the current section is the last section within the current burst $54_1$, if time slicing is supported, and within the MPE-FEC frame 42, if MPE-FEC is supported. For each time slice burst $54_1$, one MPE section $49_1$, $49_2$, $49_3$, $49_4$ is transmitted with this flag set. For each MPE-FEC frame 42, one MPE/MPE-FEC section $49_1$, $49_2$, $49_3$, $49_4$, $50_1$, $50_2$ is transmitted with this flag set.

The address field specifies a byte position in the corresponding MPE-FEC frame table 42 for the first byte of the payload carried within the section. All sections delivering data for any MPE-FEC frame table 42 are delivered in ascending order according to the value of this field. The bytes position is a zero-based linear address within an MPE-FEC frame table 42, starting from the first row of the first column, and increasing towards the end of the column. At the end of the column, the next byte position is at the first row of the next column.

The first section carrying data of a given MPE-FEC frame is an MPE section carrying the application data datagram at address "0". All sections carrying application data datagrams of a given MPE-FEC frame 42 are transmitted prior to the first section carrying RS-data of the MPE-FEC frame 42. In other words, sections $49_1$, $49_2$, $49_3$, $49_4$ carrying application data datagrams are not interleaved with sections $50_1$, $50_2$ carrying RS-data within a single MPE-FEC frame 42. All sections carried between the first and the last section of an MPE-FEC frame 42 carry data belonging to the MPE-FEC frame 42, i.e. only application data 44 and RS data 47 is used. Sections delivering data of different MPE-FEC frames are not interleaved.

The section following the last section carrying application data datagram on an MPE-FEC frame 42 contain either the first section carrying the RS-data of the same MPE-FEC frame or the first application data section of the next MPE-FEC frame. In the later case, RS-data of the first MPE-FEC frame is not transmitted. For each MPE-FEC frame 42, one MPE section is transmitted with the address field set to "0". For each MPE-FEC frame 42 in which any RS data is transmitted, one FEC section is transmitted with the address field set to "0". Padding is not used within delivered application data in the application data table 44. Datagrams do not overlap in an application data table. Padding is not used within delivered RS data in the RS table 42.

Addressing starts from zero within each MPE-FEC frame table. If both time slicing and MPE-FEC are used on an elementary stream, each burst on the elementary stream shall contain exactly one MPE-FEC frame 42. In other words, the MPE-FEC frame 42 is not split over multiple bursts.

If MPE-FEC is not supported on the elementary stream, the address field is reserved for future use. When not used, the address field is set to 0x00.

Preparing and Signalling Time Slicing and Forward Correction Error Parameters

Time slicing and MPE-FEC parameters may be advantageously signalled in order to help receiving devices $5_1$, $5_2$ (FIG. 1) determine whether or not they are able to receive time-sliced transmissions and to process a time-sliced transmission, which may or may not employ forward error correction.

A number of parameters may be relevant to time slicing and, if applicable, forward error correction. Table 4 below lists these parameters:

TABLE 4

| Parameter | Description |
| --- | --- |
| $B_b$ | Bit rate for burst |
| $R_{out}$ | Bit rate at the output of the time slicing buffer or MPE-FEC table |
| $C_b$ | Average bit rate over one slicing cycle |
| $B_d$ | Burst time (duration) |
| $T_{min}$ | Minimum time between bursts |
| $T_{out}$ | Time needed to empty buffer (=buffer leakage time) |
| $B_s$ | Burst size |
| $T_{FEC}$ | MPE-FEC decoding time |

The MPE encapsulator 8 (FIG. 1) transmits at least some of these parameters using a time slice identifier descriptor as part of the service information (SI).

Figure 13:
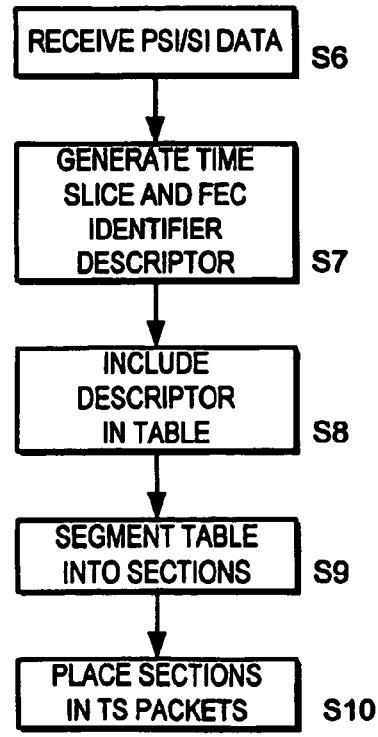
FIG. 13 is a process flow diagram of a second process performed by the MPE encapsulator shown in FIG. 2.
Figure 14:
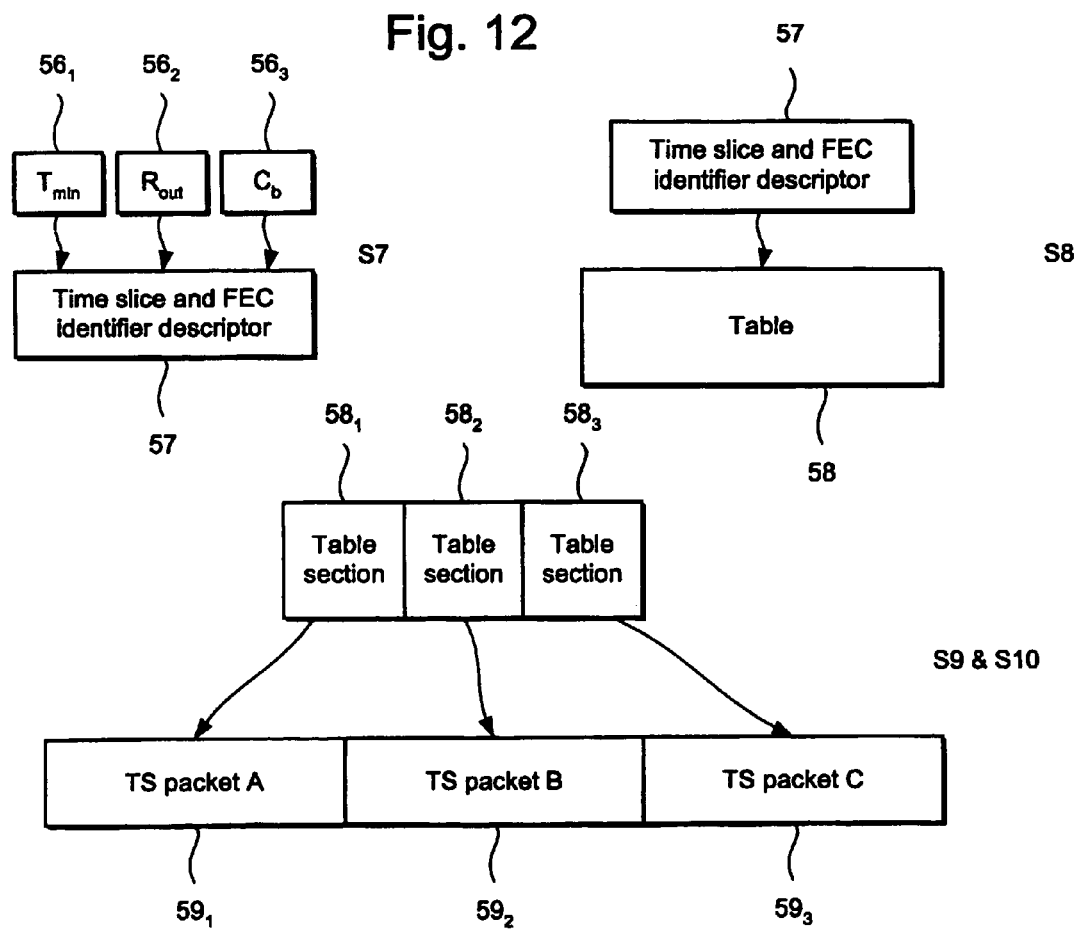
FIG. 14 shows a process by which a table including a time slicing descriptor is segmented and encapsulated.

Referring to FIGS. 2, 13 and 14, the MPE encapsulator 8 receives PSI/SI data 15 which specifies a minimum time between bursts ($T_{min}$) $56_1$, required output bit rate ($R_{out}$) $56_2$ of the time slicing buffer 39 (FIG. 6) and maximum average bit rate over one time slicing cycle ($C_b$) $56_3$ (step S6). Preferably, these parameters $56_1$, $56_2$, $56_3$ are specified by the network operator. Briefly stated, they determine the frequency and size of bursts $54_1$.

The $T_{min}$, $R_{out}$ and $C_b$ parameters $56_1$, $56_2$, $56_3$ will be described in more detail later.

The $T_{min}$, $R_{out}$ and $C_b$ parameters $56_1$, $56_2$, $56_3$ are coupled to service information which describes the delivery system, content and/or scheduling and timing of broadcast data streams by using a descriptor in tables used to signal service information to receiving devices $5_1$, $5_2$.

The parameters $56_1$, $56_2$, $56_3$ are inserted into a time slice identifier descriptor 57. The syntax of the time slice identifier descriptor 57 is given in Table 5 below:

TABLE 5

| Syntax | No. of bits | Identifier |
|---|---|---|
| Time_slice_fee_identifier_descriptor ( ){ | | |
| descriptor_tag | 8 | uimsbf |
| descriptor_length | 8 | uimsbf |
| time_slicing | 1 | bslbf |
| mpe_fec | 2 | uimsbf |
| frame_size | 5 | uimsbf |
| max_burst_duration | 8 | uimsbf |
| max_average_rate | 4 | |
| min_off_time | 3 | |
| for(i=0; i<N; i++){ | | |
| reserverd_for_future use | 1 | bslbf |
| } | | |
| } | | |

According to Table 5 above, the descriptor_tag field is provided with a value agreed specified by a standards organisation. The descriptor_length field specifies the number of bytes immediately following the field. The time_slicing field indicates, whether the referred elementary stream is time sliced. A value "1" indicates that time slicing being used, while a value "0" indicates that time slicing is not used. The mpe_fec field indicates whether the referred elementary stream uses MPE-FEC and, if so, what algorithm is used. The mpe_fec field may be coding according to Table 6 below:

TABLE 6

| Value | MPE-FEC | Algorithm |
|---|---|---|
| 0x00 | Not used | n/a |
| 0x01 | Used | Reed-Solomon (255, 191, 64) |
| 0x02 ... 0x03 | Reserved for future use | Reserved for future use |

According to Table 5 above, the frame_size field is used to give information that a decoder may use to adapt its buffering usage. The exact interpretation depends on whether time slicing and/or MPE-FEC are used. The max_burst_duration field is used to indicate the maximum burst duration in the concerned elementary stream. A burst does not start before $T_1$ and shall end not later than at $T_2$, where $T_1$ is the time indicated by delta-t on a previous burst, and $T_2 = T_1$+maximum burst duration. The indicated value for maximum burst duration preferably lies within a range from 20 ms to 512 s in 20 ms steps. The maximum burst duration=max_burst_duration×20 milliseconds.

If time_slicing is set to "0", i.e. time slicing is not used, then this field is reserved for future use and is set to 0x00 when not used. If time_slicing is set to "1", i.e. time slicing is used, then this field indicates the maximum number of bits on section level allowed within a time slice burst on the elementary stream. Bits are calculated from the beginning of the table_id field to the end of the CRC_32 field.

If mpe_fec is set to "1", i.e. MPE-FEC is used, then this field indicates the exact number of rows on each MPE-FEC frame on the elementary stream. When both time slicing and MPE-FEC are used on the elementary stream, both limitations (i.e. the maximum burst size and the number of rows) apply. Frame_size field may be coded according to Table 7 below:

TABLE 7

| Size | Max Burst size | MPE-FEC frame rows |
|---|---|---|
| 0x00 | 128 kbits | 64 |
| 0x01 | 256 kbits | 128 |
| 0x02 | 384 kbits | 192 |
| 0x03 | 512 kbits | 256 |
| 0x04 | 640 kbits | 320 |
| 0x05 | 768 kbits | 384 |
| 0x06 | 896 kbits | 448 |
| 0x07 | 1 024 kbits | 512 |
| 0x08 | 1 152 kbits | 576 |
| 0x09 | 1 280 kbits | 640 |
| 0x0A | 1 408 kbits | 704 |
| 0x0B | 1 536 kbits | 768 |
| 0x0C | 1 664 kbits | 832 |
| 0x0D | 1 792 kbits | 896 |
| 0x0E | 1 920 kbits | 960 |
| 0x0F | 2 048 kbits | 1024 |
| 0x10 to 0x1F | Reserved for future use | Reserved for future use |

If the max_frame_size field indicates "reserved_for_future_use", the receiver assumes that the maximum burst size is greater than 2 Mbits and MPE-FEC frame rows more than 1024.

In the event that time slicing is not used, i.e. MPE-FEC frames are transmitted without any time slicing, a field that supports a cyclic MPE-FEC frame index within the elementary stream can be used for control purposes. The value of the field increases by one for each subsequent MPE-FEC frame. After value "111111111111", the field restarts from "000000000000".

The max_average rate field is used to define the maximum average bit rate in MPE section payload 52 (FIG. 10) over one time slicing cycle or MPE-FEC cycle. specifies $R_{out}$. The maximum average bit rate is given by:

$$C_b = \frac{B_s}{T_c} \quad (1)$$

where $B_s$ the size of the current time slicing burst or MPE-FEC frame in MPE section payload bits and $T_c$ is the time from the transport_packet carrying the first byte of the first MPE section in the current burst/frame to the transport_packet carrying the first byte of the first MPE section in the next burst/frame within the same elementary stream. The field may be coded according to Table 8 below:

TABLE 8

| max_average_rate | Description |
|---|---|
| 0000 | 16 kps |
| 0001 | 32 kps |
| 0010 | 64 kps |
| 0011 | 128 kps |
| 0100 | 256 kps |
| 0101 | 512 kps |
| 0110 | 1024 kps |
| 0111 | 2048 kps |
| 1000–1111 | Reserved for future use |

If MPE-FEC is used, the RS data is not included in $B_s$. The max_average rate field may comprise fewer than 4 bits, for example 3 bits. It will be appreciated that different coding may be used.

The min_off_time field specifies $T_{out}$ and a may be coded according to Table 9 below:

TABLE 9

| min_off_time | Description |
|---|---|
| 000 | 0 ms |
| 001 | 50 ms |
| 010 | 300 ms |
| 011 | 1000 ms |
| 100 | 3000 ms |
| 101 | 5000 ms |
| 110 | 7000 ms |
| 111 | 9000 ms |

It will be appreciated that different coding may be used.

The MPE encapsulator 8 preferably formats data in accordance with ETSI Standard EN 300 468 "Digital Video Broadcasting (DVB); Specification for Service Information (SI) in DVB broadcasting" V1.5.1 (2003-01).

Referring again to FIG. 14, the time slice identifier descriptor 57 is used in a Network Information Table (NIT) 58 (step S8). The syntax of the NIT is shown in Table 10 below:

TABLE 10

| Syntax | No. of bits | Identifier |
|---|---|---|
| network_information_section( ){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0;i<N;i++){ | | |
|     descriptor( ) | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor( ) | | |
|     } | | |
|   } | | |
|   CRC_32 | 32 | rpchof |
| } | | |

When located in the first descriptor loop, the descriptor applies to all transport streams announced within the table. The descriptor applies to all elementary streams having stream_type field value of 0x0D, which defines MPE coded data, on any of the transport streams.

When located in the second descriptor loop, the descriptor applies to the transport stream in question. The descriptor applies to all elementary streams having stream_type field value of 0x0D. This descriptor overwrites possible descriptors in the first descriptor loop.

The descriptor 57 may be included in other types of table, such as in a IP/MAC Notification Table (INT).

When located in the platform descriptor loop, the descriptor applies to all elementary streams referred to within the table. This descriptor overwrites possible descriptors in NIT.

When located in the target descriptor loop, the descriptor applies to all elementary streams referred within the target descriptor loop in question after the appearance of the descriptor. This descriptor overwrites possible descriptors in the platform descriptor loop and in NIT. In case an elementary stream is referred from multiple locations within an INT, each contains the same signalling.

The table 58 is segmented (step S9) and table sections 58$_1$, 58$_2$, 58$_3$ are mapped TS packets 59$_1$, 59$_2$, 59$_3$, labeled in this case with PID=0x0010 (step S10). The TS packets 59$_1$, 59$_2$, 59$_3$ are multiplexed into the transport stream 16 (FIG. 2). PSI/SI data is usually not time-sliced.

The receiving device 5$_1$, 5$_2$ usually only accesses an NIT when connecting to the network 10 (FIG. 1). When changing from one transport stream 16 to another (not shown), the receiving device 5$_1$, 5$_2$ may need to read the content of an INT, but usually not more than once. Changes in the INT can be signalled in PSI using a PMT table(not shown), thus ensuring that constant filtering of the INT is not required.

PSI tables are usually re-transmitted at least once in every 100 ms. If the duration of a burst is longer than 100 ms, the receiving device 5$_1$, 5$_2$ has access to all PSI tables while receiving a burst. For shorter bursts, the receiving device 5$_1$, 5$_2$ may choose to keep the receiver 22$_1$ on until all required PSI tables are received.

In summary, the MPE encapsulator 8 transmits data comprising MPE and MPE-FEC sections 49$_1$, 49$_2$, 49$_3$, 49$_4$, 50$_1$, 50$_2$ (FIG. 12) which are arranged in bursts 54$_1$ and which are included in TS packets 55$_1$, 55$_2$, 55$_3$ (FIG. 12) in an elementary stream labeled with one PID and signals time slicing parameters in service information included in a table 58 (FIG. 14) which is included in TS packets 59$_1$, 59$_2$, 59$_3$ (FIG. 14) labeled with another, different PID.

These time slicing parameters can be employed by receiving devices 5$_1$, 5$_2$ to help achieve better power savings and improve quality of service, as will now be described:

$T_{min}$ & $R_{out}$

Figure 15:
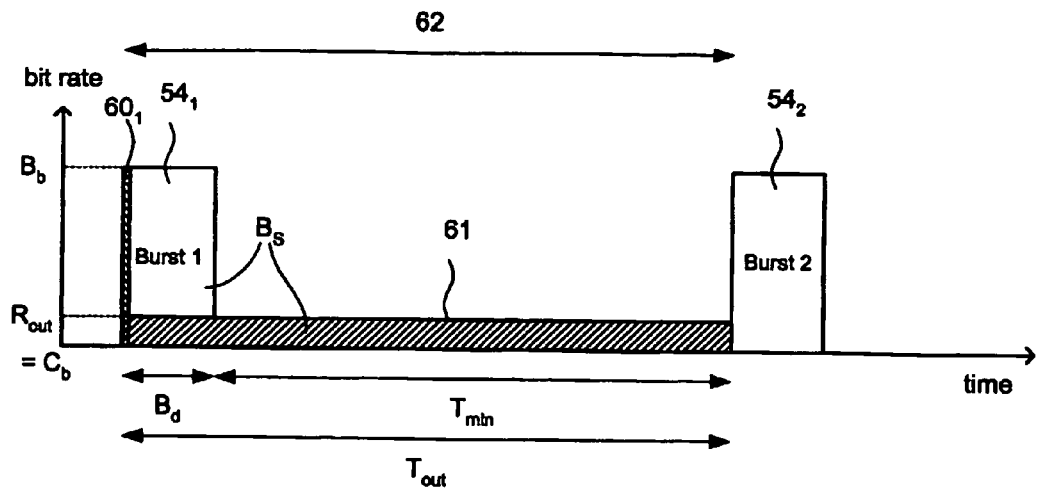
FIG. 15 illustrates filling and emptying a time slicing buffer when no forward error correction decoding is used.

Referring to FIG. 15, a first case is shown in which first and second bursts 54$_1$, 54$_2$ are transmitted by the MPE encapsulator 8 to the receiving devices 5$_1$, 5$_2$ and in which FEC decoding is not employed or where no MPE-FEC sections are transmitted.

The first burst 54$_1$ is transmitted at a bit rate $B_b$ and has a burst time $B_d$. Thus, the burst size $B_s = B_b \times B_d$. When the first datagram 60$_1$ of the burst 54$_1$ is received by a receiving device 5$_1$, 5$_2$, the time slicing buffer 39 (FIG. 6) can begin to output data 61$_1$.

The second burst 54$_2$ cannot be accommodated before the time slicing buffer 39 (FIG. 6) is empty. It takes $T_{out}$ to empty the buffer 39 (FIG. 6). Thus, the limiting factor is the speed with which buffer 39 (FIG. 6) can be emptied, i.e. the buffer leakage rate $R_{out}$. If the buffer is to be emptied before the second burst 54$_2$ arrives, then the average bit rate $C_b$ over one time slicing cycle 62 must be equal to, or less than, $R_{out}$.

Figure 16:
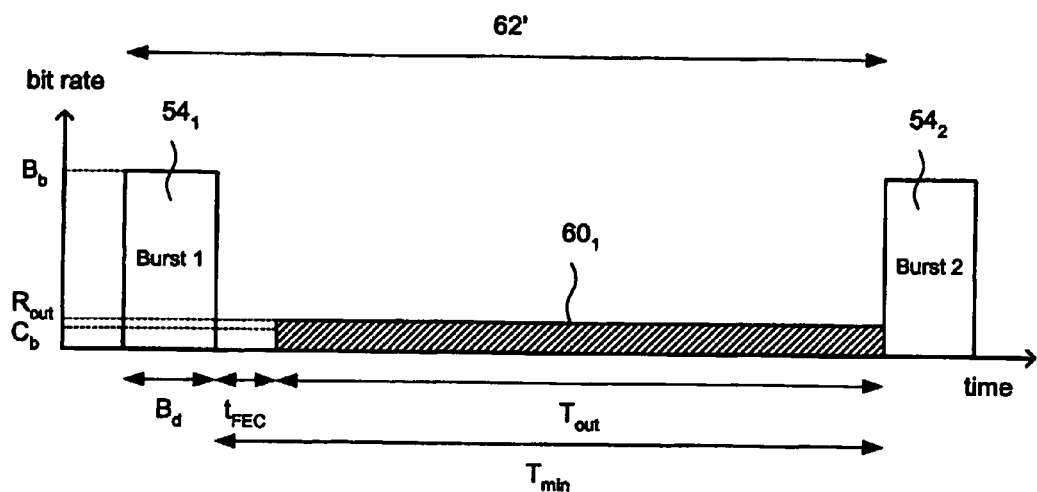
FIG. 16 illustrates filling and emptying a time slicing buffer when forward error correction decoding is used

Referring to FIG. 16, a second case is shown where FEC decoding is employed.

In this case, MPE-FEC decoding one the first burst 54$_1$ is received. However, there is a time lag, $T_{FEC}$, while data is decoded before it is output from the buffer 39. Thereafter, it takes $T_{out}$ seconds to empty the buffer 39 (FIG. 6).

The effect of the decoding time $T_{FEC}$ is to reduce the average bit rate $C_b$. A problem may arise, particularly if the burst size $B_s$ is small. If no account of $T_{FEC}$ is taken, then there is a danger that the time slicing buffer 39 (FIG. 6) may not be emptied before the next burst 54$_2$ arrives. Therefore, it is advantageous to specify $T_{min}$ in addition to $C_b$.

Figure 17:
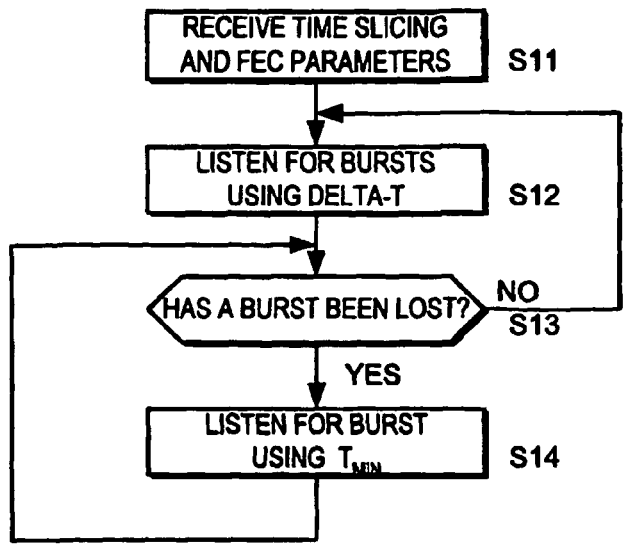
FIG. 17 is process flow diagram of a first process performed by the mobile telephone handset shown in FIG. 4.

Thus, the receiving devices $5_1$, $5_2$ may use $T_{min}$ and processes which can be performed by receiving devices $5_1$, $5_2$ will now be described:

Referring to FIG. 17, if a whole time slicing burst $54_1$ is lost with consequential loss of a delta-t value, the receiver $22_1$ (FIG. 4) can still be turned off because the next burst $54_2$ is not expected to arrive before $T_{min}$. Thus, the receiver $22_1$ (FIG. 4) can be turned on again after $T_{min}$ (steps S11 to S14)

Figure 18:
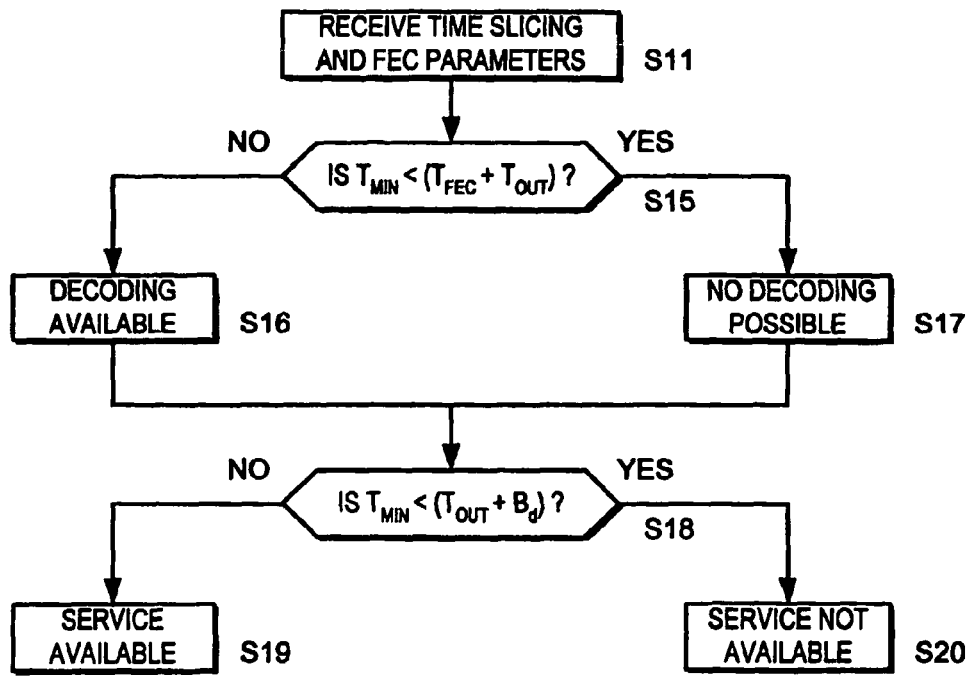
FIG. 18 is process flow diagram of a second process performed by the mobile telephone handset shown in FIG. 4.

Referring to FIG. 18, the receiving device $5_1$, $5_2$ can use $T_{min}$ to determine whether there is enough the time to decode MPE-FEC frames (steps S11 & S15 to S20). If $T_{min}$ is less than the actual decoding time $T_{FEC}$, the receiver $22_1$ (FIG. 4) may be able to support the service but not decoding (steps S17). The receiving device $5_1$, $5_2$ can then indicate to the user and/or the network 10 (FIG. 1) that quality of the service may fall and/or that the service is not supported.

Based on $T_{min}$, the receiving device $5_1$, $5_2$ can decide what kind of handover procedure to use.

For example, the receiving device $5_1$, $5_2$ can measure signal strength at different frequencies and/or in different cells and calculate respective bit error rates. The receiving device $5_1$, $5_2$ can decide which frequency and cell provide the best available conditions for receiving the current service. If $T_{min}$ is long enough, a complete handover can be performed during one off time. Otherwise, handover is performed over several off periods by taking a measurement of one frequency in one sell done during each off time.

During handover in which bursts from different cells (not shown) are synchronized with phase shift, the MPE encapsulator 8 (FIG. 1) can set $T_{min}$ to be long enough such that the receiving device $5_1$, $5_2$, while listening in given cell, can empty the buffer 39 (FIG. 6) and synchronize to a new frequency in other cell before the next burst arrives.

Based on $T_{min}$, the receiving device $5_1$, $5_2$ can decide what other operations and/or functions can performed or used during an off time.

Figure 19:
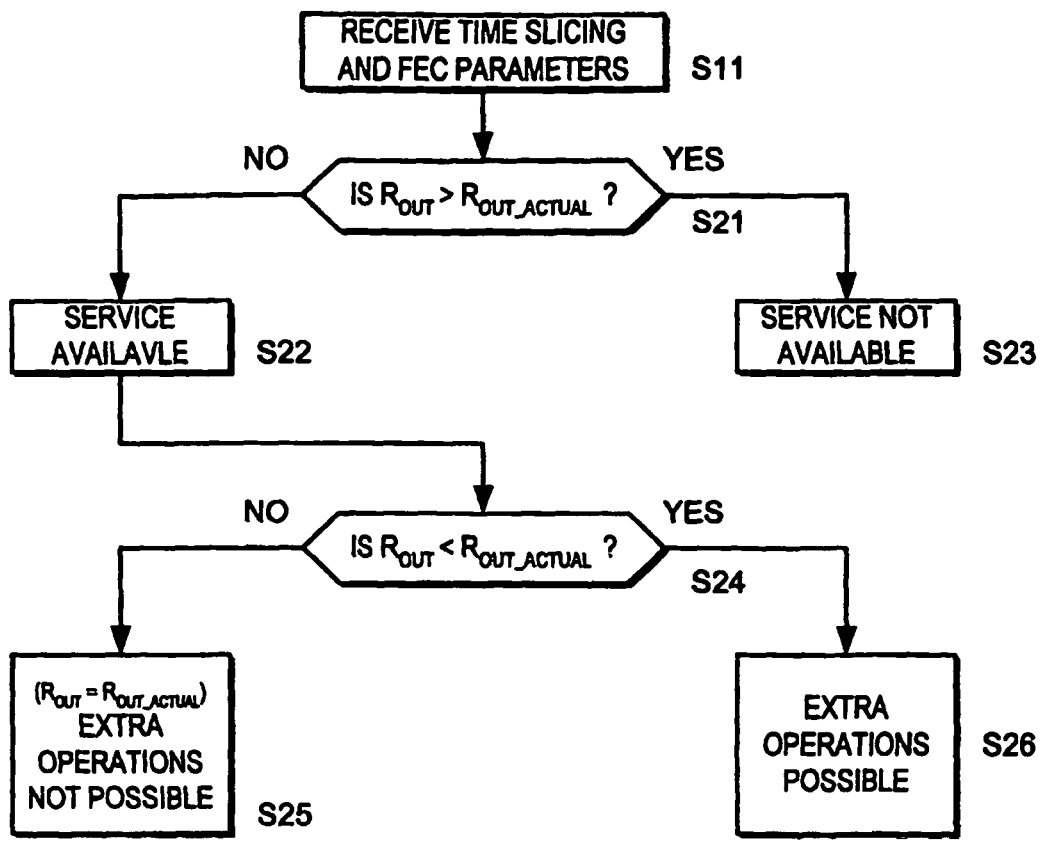
FIG. 19 is process flow diagram of a third process performed by the mobile telephone handset shown in FIG. 4.

The receiving devices $5_1$, $5_2$ may advantageously use $R_{out}$ and processes which can be performed by receiving devices $5_1$, $5_2$ will now be described:

Referring to FIG. 19, if the required $R_{out}$ is greater than the actual leakage rate $R_{out\text{-}t\_actual}$, the receiving device $5_1$, $5_2$ can indicate to the user and/or the network 10 (FIG. 1) that the service is not supported (steps S11, S22 & S23).

If the required $R_{out}$ is less than the actual leakage rate $R_{out\_actual}$, there is extra time between bursts $54_1$, $54_2$ to perform other operations on the data and/or to use time slicing buffer output bus (not shown) for transmitting other data than the burst data. Thus, the buffer leakage does not have to start immediately (steps S24 to S26).

If there is enough buffer memory to support more than one time slicing channel/service, the receiving device $5_1$, $5_2$ can add up the required leakage rates $R_{out}$ to determine whether the actual leakage rate $R_{out\_actual}$ can support all the channels.

Other parameters which could be signalled include the maximum off time $T_{max}$ and a flag which indicates whether or not the burst interval is constant.

It will be appreciated that many modifications may be made to the embodiments described above. For example, fixed receiving devices may be used.

The invention claimed is:

1. A method comprising:
   including a set of time-slicing parameters in service information to be transmitted over a communications network, said time-slicing parameters describing bursts of data to be transmitted over the communications network to one or more receivers;
   causing, by a computing device, said service information to be transmitted over said communications network to provide the time-slicing parameters to said one or more receivers;
   forming a plurality of bursts according to said set of time-slicing parameters, each of the plurality of bursts including an indication of time to a next burst; and
   causing, by the computing device, the plurality of bursts to be transmitted over said communications network to provide the plurality of bursts to said one or more receivers.

2. The method according to claim 1, wherein said set of time-slicing parameters comprises:
   a definition of a minimum time between the bursts of data.

3. The method according to claim 1, wherein said set of time-slicing parameters comprises:
   a definition of a desired output rate of a buffer for receiving and outputting at least one of the bursts of data.

4. The method according to claim 1, wherein said set of time-slicing parameters comprises:
   a definition of a maximum average transfer rate over one time-slicing cycle.

5. The method according to claim 1, wherein including said set of time-slicing parameters in service information to be transmitted over said communications network comprises including said set of time-slicing parameters in a descriptor; and
   wherein causing said service information over to be transmitted over said communications network comprises transmitting the descriptor over said communications network.

6. The method according to claim 5, further comprising:
   including said descriptor in a table that describes service provided through said communications network.

7. The method according to claim 5, further comprising:
   including said descriptor in a table that describes a configuration of said communications network.

8. The method according to claim 1, wherein:
   the plurality of bursts comprise data segments.

9. The method according to claim 1, wherein:
   the plurality of bursts comprise multiprotocol encapsulation sections.

10. The method according to claim 1, wherein:
    each of the plurality of bursts comprises a multiprotocol encapsulation-forward error correction frame.

11. The method according to claim 10, the method comprising:
    encapsulating said multiprotocol encapsulation-forward error correction frame in at least one transport stream packet.

12. The method according to claim 1, wherein:
    each of the plurality of bursts comprises a set of sections.

13. The method according to claim 12, the method comprising:
    encapsulating said set of sections in at least one transport stream packet.

14. The method according to claim 1, wherein:
    said communications network is a digital video broadcasting system.

15. The method according to claim 1, the method comprising:
    forwarding the plurality of bursts to a network element.

16. A method comprising:
    providing, by a computing device, a set of time-slicing parameters that describe bursts of data to be transmitted over a communications network for inclusion in service information that is transmitted over said communications network to one or more receivers;

forming a plurality of bursts according to said set of time-slicing parameters, each of the plurality of bursts including an indication of time to a next burst; and providing, by the computing device, said plurality of bursts for transmission over the communications network to at least one of the one or more receivers.

17. The method according to claim 16, wherein said set of time-slicing parameters includes a maximum average transfer rate over one time-slicing cycle.

18. A method comprising:

receiving, by a computing device, service information transmitted over a communications network and from a data source;

obtaining, by the computing device, from said service information a set of time-slicing parameters that describe data bursts to be transmitted over the communications network and from the data source; and configuring, by the computing device, a receiver to receive the data bursts in dependence upon said set of time-slicing parameters, each of the data bursts including an indication of time to a next burst.

19. The method according to claim 18, wherein obtaining from said service information the set of time-slicing parameters comprises:

retrieving data relating to a maximum average transfer rate over one time-slicing cycle.

20. The method according to claim 18, further comprising:

based on the set of time-slicing parameters, determining whether the data bursts can be buffered by the computing device.

21. The method according to claim 18, further comprising:

determining that at least one of the data bursts has not been received; and responsive to determining that at least one of the data bursts has not been received, configuring the receiver to receive at least a next data burst using the indication of time to the next burst.

22. The method according to claim 18, further comprising:

determining whether there is enough time to decode data received within one of the data bursts.

23. The method according to claim 18, wherein said set of time-slicing parameters includes a given output rate of a buffer and the method further comprises:

determining whether said given output rate exceeds a buffer output rate of the computing device.

24. A method comprising:

including a set of time-slicing parameters in service information to be transmitted over a communications network from a data source, said time-slicing parameters describing bursts of data to be transmitted over a communications network from the data source;

forming a plurality of bursts according to said set of time-slicing parameters, each of the plurality of bursts including an indication of time to a next burst; and transmitting the plurality of bursts over said communications network from the data source.

25. The method according to claim 24, wherein said set of time-slicing parameters comprises a maximum average transfer rate over one time-slicing cycle.

26. The method according to claim 24, comprising:
transmitting said service information over said communications network.

27. A network element comprising:

an encapsulator configured to at least:

include a set of time-slicing parameters that describe bursts of data to be transmitted over a communications network from the network element in service information to be transmitted over the communications network from the network element;

provide said service information for transmission over the communications network from the network element;

form bursts according to said set of time-slicing parameters, each of the formed bursts including an indication of time to a next burst; and provide said bursts for transmission over the communications network from the network element.

28. The network element according to claim 27, further comprising:

a transmitter configured to transmit said service information over said communications network.

29. The network element according to claim 27, wherein said set of time-slicing parameters comprises a maximum average transfer rate over one time-slicing cycle.

30. A terminal comprising:

a receiver;

a processor configured to control operation of said receiver; and memory storing computer software, the computer software configured to, with the processor, cause the terminal at least to:

receive service information transmitted over a communications network and from a data source, obtain from said service information a set of time-slicing parameters that describe bursts of data to be transmitted over the communications network and from the data source, and control operation of said receiver to receive the bursts of data in dependence upon said set of time-slicing parameters, each of the bursts of data including an indication of time to a next burst.

31. The terminal according to claim 30, wherein the computer software also is further configured to, with the processor, cause the terminal to obtain a maximum average transfer rate over one time-slicing cycle from said set of time-slicing parameters.

32. An apparatus comprising:

a processor; and memory including computer software, the computer software configured to, with the processor, cause the apparatus at least to:

receive service information transmitted over a communications network and from a data source, obtain from said service information a set of time-slicing parameters that describes data bursts to be transmitted over the communications network and from the data source, and control operation of a receiver to receive the data bursts in dependence upon said set of time-slicing parameters, each of the data bursts including an indication of time to a next burst.

* * * * *